US012732109B2

(12) United States Patent
Yang et al.

(10) Patent No.: US 12,732,109 B2
(45) Date of Patent: Sep. 8, 2026

(54) ISOLATED POWER SUPPLY CONTROL CIRCUIT AND ISOLATED POWER SUPPLY

(71) Applicant: SHANGHAI BRIGHT POWER SEMICONDUCTOR CO., LTD., Shanghai (CN)

(72) Inventors: Pengbo Yang, Shanghai (CN); Zhen Zhu, Shanghai (CN); Xiaoru Gao, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 326 days.

(21) Appl. No.: 18/525,238

(22) Filed: Nov. 30, 2023

(65) Prior Publication Data

US 2024/0223090 A1 Jul. 4, 2024

(30) Foreign Application Priority Data

Dec. 30, 2022 (CN) ........................ 202211728432.5

(51) Int. Cl.

*H02M 3/335* (2006.01)
*H02M 1/00* (2007.01)
*H02M 1/088* (2006.01)

(52) U.S. Cl.

CPC ..... *H02M 3/33523* (2013.01); *H02M 1/0022* (2021.05); *H02M 1/088* (2013.01); *H02M 3/33592* (2013.01)

(58) Field of Classification Search

CPC ............... H02M 3/28; H02M 3/33592; H02M 3/33523; H02M 3/38; H02M 1/31;
(Continued)

(56) References Cited

U.S. PATENT DOCUMENTS 7,548,436 B1 * 6/2009 Chen ................. H02M 3/33561 363/21.04
9,407,155 B2 * 8/2016 Wang ................ H02M 3/33592
(Continued)

FOREIGN PATENT DOCUMENTS

CN 203491883 U * 3/2014
CN 108923654 A * 11/2018 ............. H02M 3/28
(Continued)

OTHER PUBLICATIONS

Machine Translation CN-111541361-B (Year: 2021).*
(Continued)

*Primary Examiner* — Thienvu V Tran
*Assistant Examiner* — Yahveh Comas Torres
(74) *Attorney, Agent, or Firm* — MUNCY, GEISSLER, OLDS & LOWE, P.C.

(57) ABSTRACT

A control circuit for an isolated power supply and an isolated power supply are disclosed. The control circuit includes a secondary-side and a primary-side control signal generation circuits. In a present switching period, the secondary-side control signal generation circuit provides an indication for turning on asynchronous rectification transistor when detecting that a voltage across a secondary-side winding reaches a first predetermined voltage and provides an indication for turning off the synchronous rectification transistor when a period of time over which the synchronous rectification transistor is conducted reaches a first conduction time. The first conduction time is adjustable based on a first instant at which an indication for turning off the synchronous rectification transistor was provided in a previous switching period, a second instant at which an indication for turning on a primary-side switching transistor was provided in the previous switching period and a predetermined reference period.

18 Claims, 6 Drawing Sheets

(58) Field of Classification Search
CPC ...... H02M 1/08; H02M 1/088; H02M 1/0022; Y02B 70/10
See application file for complete search history.

(56) References Cited

U.S. PATENT DOCUMENTS

| | | | | |
|---|---|---|---|---|
| 11,626,871 | B2 * | 4/2023 | Miletic | H02M 3/33571 363/21.14 |
| 11,909,322 | B2 * | 2/2024 | Li | H02M 1/44 |
| 11,984,813 | B2 * | 5/2024 | Xu | H02M 1/38 |
| 12,155,316 | B2 * | 11/2024 | Guo | H02M 1/0048 |
| 2014/0204625 | A1 * | 7/2014 | Liu | H02M 3/33592 363/21.13 |
| 2016/0190942 | A1 * | 6/2016 | Kikuchi | H02M 3/33576 363/21.14 |
| 2017/0155335 | A1 * | 6/2017 | Chang | H02M 1/36 |
| 2018/0358902 | A1 * | 12/2018 | Duvnjak | H02M 3/33592 |
| 2019/0149032 | A1 * | 5/2019 | Yang | H02M 1/083 363/21.14 |
| 2020/0036280 | A1 * | 1/2020 | Yang | H02M 3/33592 |
| 2020/0112266 | A1 * | 4/2020 | Hara | H02M 3/33523 |
| 2020/0169179 | A1 * | 5/2020 | Hara | H02M 1/38 |
| 2022/0052613 | A1 * | 2/2022 | Xu | H02M 3/33515 |
| 2022/0200466 | A1 * | 6/2022 | Guo | H02M 1/38 |
| 2024/0154537 | A1 * | 5/2024 | Guo | H02M 1/348 |

FOREIGN PATENT DOCUMENTS

| | | | | | |
|---|---|---|---|---|---|
| CN | 111478589 | A | * | 7/2020 | H02M 1/08 |
| CN | 212677084 | U | * | 3/2021 | |
| CN | 109768708 | B | * | 4/2021 | |
| CN | 113162390 | A | * | 7/2021 | H02M 1/38 |
| CN | 213637509 | U | * | 7/2021 | |
| CN | 115021521 | A | * | 9/2022 | H02M 1/32 |
| CN | 111541361 | B | * | 9/2023 | H02M 1/088 |
| TW | I635699 | | * | 9/2018 | |

OTHER PUBLICATIONS

Machine Translation CN-108923654-(Year: 2018).*
Machine Translation CN_109768708 (Year: 2021).*
Machine Translation CN-111478589-A (Year: 2020).*
Machine Translation CN_113162390 (Year: 2021).*
Machine Translation CN_115021521 (Year: 2022).*
Machine Translation CN_203491883 (Year: 2014).*
Machine Translation CN_212677084_U (Year: 2021).*
Machine Translation CN_213637509 (Year: 2021).*
Machine Translation TW_1635699 (Year: 2018).*

* cited by examiner

ISOLATED POWER SUPPLY CONTROL CIRCUIT AND ISOLATED POWER SUPPLY

CROSS-REFERENCE TO RELATED APPLICATION

This application claims the priority of Chinese patent application number 202211728432.5, filed on Dec. 30, 2022, and entitled "ISOLATED POWER SUPPLY CONTROL CIRCUIT AND ISOLATED POWER SUPPLY", the entire contents of which are incorporated herein by reference.

TECHNICAL FIELD

This application relates to the field of electronic circuits and, in particular, to an isolated power supply control circuit and an isolated power supply.

BACKGROUND

In existing isolated power supplies, turn-on and turn-off instants for a secondary-side synchronous rectification transistor are typically determined by detecting a slope and/or a zero-crossing point of a voltage signal across a secondary-side winding. However, in practical applications, controlling the secondary-side synchronous rectification transistor in this way is associated with many problems. For example, in a discontinuous inductor current mode (DCM), there is a chance that a sharp voltage change caused by a free harmonic oscillation in the inductor arising from leakage inductance in a transformer may be falsely identified as a signal to operate the secondary-side synchronous rectification transistor. That is, there is a possibility for erroneous turn-on of the secondary-side synchronous rectification transistor. Moreover, in a continuous inductor current mode (CCM), as the secondary-side synchronous rectification transistor is always turned off after a primary-side switching transistor is turned on, there is a chance for simultaneous conduction of the primary-side and secondary-side circuits during operation of the isolated power supply. Therefore, in order to prevent breakdown, current limitation in operation of the isolated power supply is necessary, which, however, may degrade conversion efficiency of the isolated power supply.

In view of this, the present application provides a control circuit for an isolated power supply, which can address anti-breakdown issues associated with existing isolated power supplies, thus improving the safety performance and overall conversion efficiency of the isolated power supply.

SUMMARY OF THE INVENTION

Herein, a control circuit for an isolated power supply is provided. The isolated power supply comprises: a transformer comprising a primary-side winding and a secondary-side winding; a primary-side switching transistor coupled to the primary-side winding; and a synchronous rectification transistor coupled to the secondary-side winding. The control circuit comprises: a secondary-side control signal generation circuit, comprising: an input terminal that is electrically connected to the secondary-side winding and is for detecting a voltage signal across the secondary-side winding; and an output terminal that is electrically connected to a control terminal of the synchronous rectification transistor and is for outputting a control signal for the synchronous rectification transistor; and a primary-side control signal generation circuit, comprising: an input terminal for receiving a signal indicating that the synchronous rectification transistor is OFF; and an output terminal that is electrically connected to a control terminal of the primary-side switching transistor and is for outputting a control signal for the primary-side switching transistor. In a present switching period, the secondary-side control signal generation circuit provides an indication for turning on the synchronous rectification transistor when detecting that the voltage signal across the secondary-side winding reaches a first predetermined voltage; and provides an indication for turning off the synchronous rectification transistor when a period of time over which the synchronous rectification transistor has been conducted reaches a first conduction time, wherein the first conduction time is adjustable based on a first instant at which an indication for turning off the synchronous rectification transistor was provided in a previous switching period, a second instant at which an indication for turning on the primary-side switching transistor was provided in the previous switching period and a predetermined reference period.

In one possible embodiment, the secondary-side control signal generation circuit may comprise: a first signal generation unit comprising an input terminal electrically connected to the secondary-side winding and an output terminal electrically connected to the synchronous rectification transistor, the first signal generation unit configured to determine an instant at which the voltage signal across the secondary-side winding reaches the first predetermined voltage as a turn-on instant for the synchronous rectification transistor, and to generate and output a rising edge of the control signal for the synchronous rectification transistor based on the turn-on instant for the synchronous rectification transistor; and a second signal generation unit comprising an input terminal electrically connected to the secondary-side winding and an output terminal electrically connected to the synchronous rectification transistor, the second signal generation unit configured to: i) determine a pulse width of a reference signal in the previous switching period; ii) adjust the first conduction time for the synchronous rectification transistor in the present switching period based on a relationship of the pulse width of the reference signal in the previous switching period and the predetermined reference period; iii) determine a turn-off instant for the synchronous rectification transistor based on an instant when the period of time over which the synchronous rectification transistor has been conducted reaches the first conduction time, and; iv) generate and output a falling edge of the control signal for the synchronous rectification transistor based on the turn-off instant for the synchronous rectification transistor, wherein the reference signal is generated based on the first instant and the second instant and its pulse width is the time difference between the first and second instants in the same period.

In one possible embodiment, the second signal generation unit may also be configured to: compare the voltage signal across the secondary-side winding with a second predetermined voltage; and determine the turn-off instant for the synchronous rectification transistor based: on an instant at which the voltage signal across the secondary-side winding reaches the second predetermined voltage; or the time instant when the period of time over which the synchronous rectification transistor has been conducted reaches the first conduction time, whichever is earlier.

In one possible embodiment, within the same period, the first instant might be earlier than the second instant.

In one possible embodiment, the second signal generation unit may comprise: a reference pulse width signal generation unit configured to generate and output a reference pulse width signal indicating the predetermined reference period; a pulse width determination unit comprising a first input terminal electrically connected to the secondary-side winding and a second input terminal electrically connected to an output terminal of the reference pulse width signal generation unit, the pulse width determination unit configured to compare the pulse width of the reference signal in the previous switching period with a period of time over which the reference pulse width signal is active; and a pulse width signal generation unit comprising an input terminal electrically connected to an output terminal of the pulse width determination unit and an output terminal electrically connected to the synchronous rectification transistor, the pulse width signal generation unit configured to: i) determine the first conduction time for the synchronous rectification transistor in the present switching period based on a comparison result output from the pulse width determination unit; ii) determine a first conduction time for the synchronous rectification transistor in the previous switching period; iii) determine the instant when the period of time over which the synchronous rectification transistor has been conducted reaches the first conduction time as the turn-off instant for the synchronous rectification transistor; and iv) generate and output the falling edge of the control signal based on the turn-off instant for the synchronous rectification transistor.

In one possible embodiment, the pulse width determination unit may comprise: a frequency and phase detection unit comprising a first input terminal electrically connected to the secondary-side winding and a second input terminal electrically connected to the output terminal of the reference pulse width signal generation unit, the frequency and phase detection unit configured to determine a relationship of the pulse width of the reference signal in the previous switching period and a pulse width of the reference pulse width signal, and to generate and output a result of frequency and phase detection; a current generation unit comprising an input terminal electrically connected to an output terminal of the frequency and phase detection unit, the current generation unit configured to: generate and output a pull-up current signal when the pulse width of the reference pulse width signal is shorter than the pulse width of the reference signal; or generate and output a pull-down current signal when the pulse width of the reference pulse width signal is longer than the pulse width of the reference signal; and a low-pass filter unit comprising an input terminal electrically connected to an output terminal of the current generation unit and an output terminal electrically connected to the input terminal of the pulse width signal generation unit, the low-pass filter unit configured to low-pass filter an electrical signal output from the current generation unit and to output the filtered electrical signal to the pulse width signal generation unit.

In one possible embodiment, the pulse width determination unit may comprise: a pulse width comparison unit comprising a first input terminal electrically connected to the secondary-side winding and a second input terminal electrically connected to the reference pulse width signal generation unit, the pulse width comparison unit configured to determine a relationship of the pulse width of the reference signal in the previous switching period and a pulse width of the reference pulse width signal, and to generate and output the comparison result; and a counter unit comprising an input terminal electrically connected to the pulse width comparison unit and an output terminal electrically connected to the input terminal of the pulse width signal generation unit, the counter unit configured to: determine a count value based on the comparison result; determine a counting result in the present period based on the count value and a counting result in the previous period; and output the counting result to the pulse width signal generation unit.

In one possible embodiment, when the comparison result indicates that the pulse width of the reference signal is longer than the pulse width of the reference pulse width signal, the counter unit may provide the pulse width signal generation unit with an indication for prolonging the first conduction time, or when the comparison result indicates that the pulse width of the reference signal is shorter than the period of time over which the reference pulse width signal is active, the counter unit may provide the pulse width signal generation unit with an indication for shortening the first conduction time.

In one possible embodiment, the pulse width signal generation unit may comprise a first signal generation element comprising a first input terminal electrically connected to an output terminal of a counter unit and an output terminal electrically connected to the control terminal of the synchronous rectification transistor, the first signal generation element configured to: start a timer at the turn-on instant for the secondary-side synchronous rectification transistor; determine an instant at which a value of the timer is equal to the counting result as the turn-off instant for the synchronous rectification transistor; and generate and output the falling edge of the control signal based on the turn-off instant for the synchronous rectification transistor.

In one possible embodiment, the primary-side control signal generation circuit may comprise: a logic module comprising an input terminal electrically connected to the output terminal of the secondary-side control signal generation circuit, the logic module configured to generate and output a first control signal when the secondary-side synchronous rectification transistor is OFF; a transmitter module comprising an input terminal electrically connected to an output terminal of the logic module, the transmitter module configured to, upon receiving the first control signal, transmit the first control signal; and a primary-side control module coupled to the transmitter module, the primary-side control module comprising an output terminal electrically connected to the primary-side switching transistor, the primary-side control module configured to, in response to receiving the first control signal, control the primary-side switching transistor to be turned on.

In one possible embodiment, the first instant might be generated: when the synchronous rectification transistor is turned off; or at the end of a first predetermined delay interval after the synchronous rectification transistor is turned off; or when the voltage signal across the secondary-side winding reaches a third predetermined voltage after the synchronous rectification transistor is turned off.

In one possible embodiment, the second instant might be generated: when the primary-side switching transistor is turned on; or at the end of a second predetermined delay interval after the primary-side switching transistor is turned on: or when the voltage signal across the secondary-side winding reaches a fourth predetermined voltage after the primary-side switching transistor is turned on.

In another aspect, there is provided herein an isolated power supply comprising the control circuit as defined above.

In the control circuit provided herein, the synchronous rectification transistor is allowed to be turned on when the primary-side switching transistor is turned off and the voltage signal across the secondary-side winding reaches the first predetermined value and to be turned off when its conduction time reaches the first conduction time. Moreover, the primary-side switching transistor is allowed to be turned on after the secondary-side synchronous rectification transistor is turned off. Additionally, the conduction time of the synchronous rectification transistor can be modified in a self-adaptive manner based on the instant the synchronous rectification transistor was turn off in the previous period, the instant the primary-side switching transistor was turn on in the previous period and the predetermined reference period. In this way, simultaneous conduction of the primary-side and secondary-side circuits is prevented, enhancing the conversion efficiency and safety performance of the isolated power supply.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present application and, together with the description, serve to explain the principles of the disclosure.

DETAILED DESCRIPTION

Figure 1:
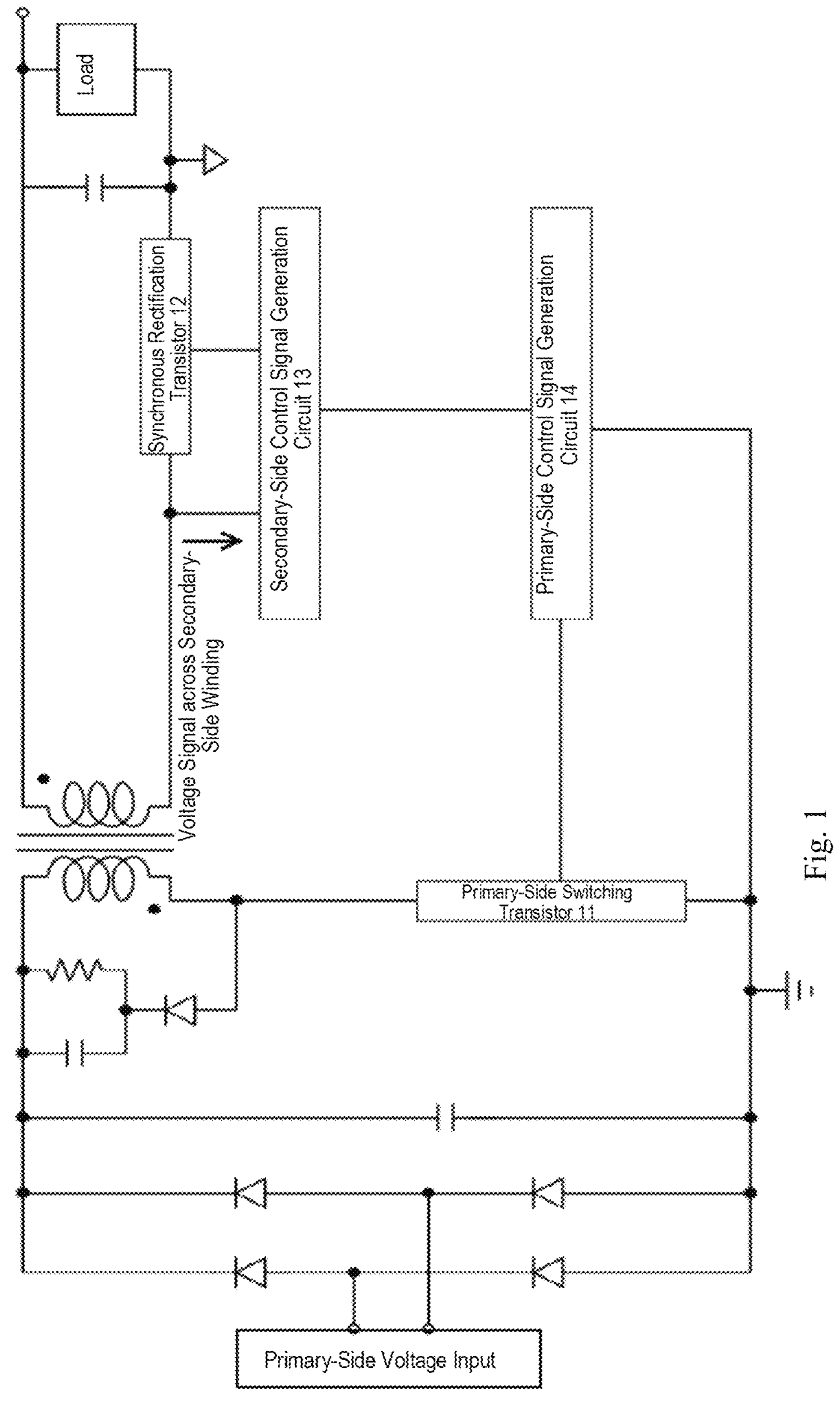
FIG. 1 is a schematic circuit diagram of an isolated power supply according to an embodiment of the present disclosure.

Various exemplary embodiments, features and aspects of the present application will be described in detail below with reference to the accompanying drawings. Elements of same function are represented with same reference numerals throughout the figures. While the various aspects of the embodiments are presented in the drawings, the drawings are not necessarily drawn to scale, unless specifically indicated.

The term "exemplary" is used herein to mean serving as an example, instance, or illustration. Any embodiment described herein as "exemplary" is not necessarily to be construed as preferred or advantageous over other embodiments.

In order to facilitate description of the present disclosure, numerous specific details are set forth in the following particular embodiments. Those skilled in the art will understand that this application may be practiced without some of the specific details. In some instances, methods, ways, elements and circuits well known to those skilled in the art have not been described in particular detail in order to avoid unnecessarily obscuring the present application.

Reference is now made to FIG. 1, a schematic circuit diagram of a control circuit for an isolated power supply according to an embodiment of the present disclosure. The isolated power supply includes: a transformer having a primary-side winding and a secondary-side winding; a primary-side switching transistor 11 coupled to the primary-side winding; and a synchronous rectification transistor coupled to the secondary-side winding. The primary-side switching transistor 11 has: a first terminal electrically connected to the primary-side winding of the isolated power supply; a second terminal electrically connected to a ground; and a control terminal electrically connected to an output terminal of a primary-side control signal generation circuit 14. The synchronous rectification transistor 12 has: a first terminal electrically connected to the secondary-side winding of the isolated power supply; a second terminal electrically connected to a ground; and a control terminal electrically connected to a secondary-side control signal generation circuit 13.

For example, the control circuit may include the secondary-side control signal generation circuit 13 and the primary-side control signal generation circuit 14.

For example, the secondary-side control signal generation circuit 13 may have: an input terminal that is electrically connected to the secondary-side winding and is for detecting a voltage signal across the secondary-side winding; and an output terminal that is electrically connected to the control terminal of the synchronous rectification transistor and is for outputting a control signal for the synchronous rectification transistor. The primary-side control signal generation circuit 14 may have: an input terminal for receiving a signal indicating turn-off of the synchronous rectification transistor; and an output terminal that is electrically connected to the control terminal of the primary-side switching transistor 11 and is for outputting a control signal for the primary-side switching transistor 11.

Figure 7:
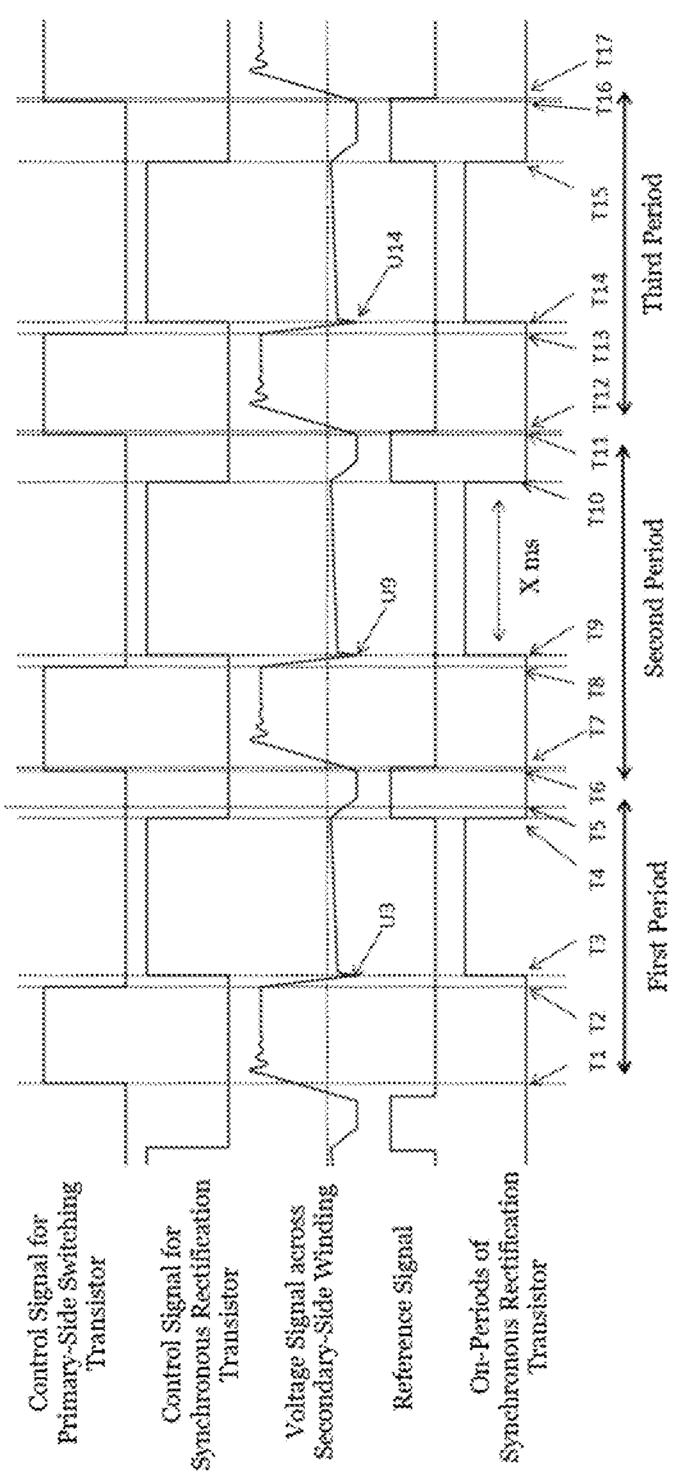
FIG. 7 is a diagram showing waveforms of multiple signals in an isolated power supply according to an embodiment of the present disclosure.

For example, in a given switching period, when the secondary-side control signal generation circuit 13 detects that the voltage signal across the secondary-side winding reaches a first predetermined voltage, it may provide an indication for turning on the synchronous rectification transistor 12. Additionally, upon a period of time after the synchronous rectification transistor 12 has been turned on reaching a first conduction time, it may provide an indication for turning off the synchronous rectification transistor 12. The first conduction time may be adjusted based on a first instant at which an indication for turning off the synchronous rectification transistor 12 was provided in the previous switching period, a second instant at which an indication for turning on the primary-side switching transistor 11 was provided in the previous switching period, and a predetermined reference period. For example, FIG. 7 shows the voltage signal across the secondary-side winding currently in a second period. In this example, a voltage signed as U9 is the first predetermined voltage. As can be seen from the control signal for the primary-side switching transistor and the voltage signal across the secondary-side winding, the primary-side switching transistor is turned off at instant T8 and remains OFF at instant T9. Moreover, in the present switching period, the voltage signal across the secondary-side winding reaches U9 (i.e., the first predetermined voltage) and, in response, the secondary-side synchronous rectification transistor 12 is turned on under the control of the secondary-side control signal generation circuit 13. The secondary-side control signal generation circuit 13 may utilize a known technique to determine whether the primary-side switching transistor 11 is OFF through detecting a change in the voltage signal across the secondary-side winding, such as a transition from positive to negative occurring within a given period of time during operation. The first predetermined voltage may be determined based on practical considerations by those skilled in the art. For example, the first conduction time may be equal to the time interval from instant T9 till instant T10. In this case, a period of time after the synchronous rectification transistor 12 has been turned on will reach the first conduction time at instant T10, and the secondary-side control signal generation circuit will responsively provide an indication for turning off the synchronous rectification transistor.

For example, the first conduction time may be adjusted based on a first instant at which an indication for turning off the synchronous rectification transistor was provided in the previous switching period, a second instant at which an indication for turning on the primary-side switching transistor was provided in the previous switching period and the predetermined reference period. Continuing the example of FIG. 7, the present switching period is the second period, and in the previous switching period, an indication for turning off the synchronous rectification transistor might be provided at instant T4 (first instant), and an indication for turning on the primary-side switching transistor might be provided at instant T6 (second instant). As an example, the predetermined reference period may be B microseconds. If the time interval from instant T4 till instant T6 is longer than a predetermined period of time, the conduction time for the synchronous rectification transistor may be prolonged, and the prolonged conduction time may be taken as the first conduction time for the synchronous rectification transistor in the second period. On the contrary, if the time interval from instant T4 till instant T6 is shorter than the predetermined period of time, then the conduction time for the synchronous rectification transistor may be shortened, and the shortened conduction time may be taken as the first conduction time for the synchronous rectification transistor in the second period.

For example, in the OFF state of the secondary-side synchronous rectification transistor 12, the secondary-side control signal generation circuit 13 may generate and output a signal indicating that the synchronous rectification transistor is OFF to the primary-side control signal generation circuit 14, thereby notifying the primary-side control signal generation circuit 14 to turn on the primary-side switching transistor 11. For example, the signal indicating that the synchronous rectification transistor being OFF may be derived from the control signal for the secondary-side synchronous rectification transistor generated by the secondary-side control signal generation circuit 13, or from a drive signal received by the secondary-side synchronous rectification transistor, or from a delayed version of either of the foregoing.

For example, the primary-side control signal generation circuit 14 may be configured to turn on the primary-side switching transistor 11 when the synchronous rectification transistor 12 is indicated at OFF state. For example, continued reference is made to FIGS. 1 and 7. As can be seen from the control signal for the primary-side switching transistor and the control signal for the synchronous rectification transistor, in the second period of the voltage signal across the secondary-side winding, the synchronous rectification transistor 12 may switch from the ON state to the OFF state at instant T10. Moreover, in the OFF state of the synchronous rectification transistor 12, the primary-side control signal generation circuit 14 may determine whether the synchronous rectification transistor 12 is OFF by detecting its state. Alternatively, in the OFF state of the synchronous rectification transistor 12, it may receive a signal generated and output by the secondary-side control signal generation circuit 13, which indicates that the synchronous rectification transistor has been turned off, thereby determining that the synchronous rectification transistor 12 is being in the OFF state. Accordingly, it may cause the primary-side switching transistor 11 to be turned on at instant T11. How the primary-side control signal generation circuit 14 determines the state of the synchronous rectification transistor is not limited to those two examples.

The control circuit provided herein allows, after the primary-side switching transistor has been turned off, the synchronous rectification transistor to be turned on at an instant in a given switching period, at which the voltage signal across the secondary-side winding reaches the first predetermined voltage. Moreover, it causes the synchronous rectification transistor to be turned off when its conduction time becomes equal to the first conduction time and allows the primary-side switching transistor to be turned on in the OFF state of the synchronous rectification transistor. In this way, the conduction time of the synchronous rectification transistor can be adjusted in a self-adaptive manner, ensuring that a time delay from the turning off of the synchronous rectification transistor to the turning on of the primary-side switching transistor is maintained substantially equal to the predetermined reference period, thus preventing simultaneous conduction of the primary-side and secondary-side circuits and ensuring safe operation of the isolated power supply.

Continuing the example of FIG. 7, the voltage signal across the secondary-side winding is currently in the second period, and a voltage U9 is the first predetermined voltage. Referring to FIG. 7, the first conduction time for the secondary-side synchronous rectification transistor 12 may have been adjusted in the first period of the voltage signal across the secondary-side winding so that, upon the voltage signal across the secondary-side winding reaching voltage U9 in the second period, instant T9 is determined as a turn-on instant for the synchronous rectification transistor. At instant T10, if the conduction time of the secondary-side synchronous rectification transistor 12 becomes equal to the first conduction time, then instant T10 is determined as a turn-off instant for the synchronous rectification transistor. Based on the turn-on and turn-off instants for the synchronous rectification transistor, i.e., T9 and T10, a control signal may be generated and output to the synchronous rectification transistor. That is, a control signal generation module may start outputting a high-level signal at instant T9 and stop outputting the high-level signal at instant T10.

For example, a reference signal may indicate a period of time from the end of a first predetermined delay interval after the secondary-side synchronous rectification transistor is turned off to an instant at which the voltage becomes equal to a second predetermined voltage. The first conduction time for the synchronous rectification transistor may be adjusted based on a relationship between a pulse width of the reference signal in the previous switching period and the predetermined reference period. Specifically, when the pulse width of the reference signal in the previous switching period is longer than the predetermined reference period, the first conduction time for the synchronous rectification transistor in the previous switching period may be prolonged, and the prolonged conduction time may be taken as the first conduction time for the synchronous rectification transistor in the present switching period. That is, the first conduction time for the synchronous rectification transistor is longer in the present switching period than in the previous switching period. When the pulse width of the reference signal in the previous switching period is shorter than the predetermined reference period, the first conduction time for the synchronous rectification transistor in the previous switching period may be shortened, and the shortened conduction time may be taken as the first conduction time for the synchronous rectification transistor in the present switching period. That is, the first conduction time for the synchronous rectification transistor is shorter in the present switching period than in the previous switching period. Continuing the example of FIG. 7, in the second period of the voltage signal across the secondary-side winding, the pulse width of the reference signal may be the period of time from instant T4 till instant T7 (referred to as the first reference period hereinafter). A second signal generation unit 1312 may compare the first reference period with the predetermined reference period to determine the first conduction time for the secondary-side synchronous rectification transistor 12. If the first reference period is 0.5 microseconds and the predetermined reference period is 0.6 microseconds, then the conduction time of the synchronous rectification transistor 12 (i.e., the first conduction time) in the second period of the voltage signal across the secondary-side winding may be shortened. In this way, if the conduction time of the secondary-side synchronous rectification transistor 12 in the first period of the voltage signal across the secondary-side winding is 0.8 microseconds, then the conduction time of the secondary-side synchronous rectification transistor 12 will be 0.7 microseconds in the second period of the voltage signal across the secondary-side winding. With continued reference to FIG. 7, in a third period of the voltage signal across the secondary-side winding, the pulse width of the reference signal may be the period of time from T10 to T12 (referred to as the second reference period hereinafter). The control signal generation module may compare the second reference period with the predetermined reference period to determine the first conduction time for the secondary-side synchronous rectification transistor 12. If the second reference period is 0.8 microseconds and the predetermined reference period is 0.6 microseconds, then the conduction time of the secondary-side synchronous rectification transistor 12 (i.e., the first conduction time) in the third period of the voltage signal across the secondary-side winding may be prolonged. In this way, if the conduction time of the secondary-side synchronous rectification transistor 12 in the second period of the voltage signal across the secondary-side winding is 0.7 microseconds, then the conduction time of the secondary-side synchronous rectification transistor 12 will be 0.9 microseconds in the third period of the voltage signal across the secondary-side winding. In this way, an average pulse width of the reference signal over a certain length of time may be maintained approximately equal to the predetermined reference period. In the first period of the voltage signal across the secondary-side winding, the control signal generation module may be based on a predetermined value stored therein to determine the first conduction time for the secondary-side synchronous rectification transistor 12.

In the control circuit disclosed herein, in the first period of the voltage signal across the secondary-side winding, an OFF control signal can be used to adjust the first conduction time for the secondary-side synchronous rectification transistor based on the predetermined reference period, so that the secondary-side synchronous rectification transistor is turned off at a desired time.

Figure 8:
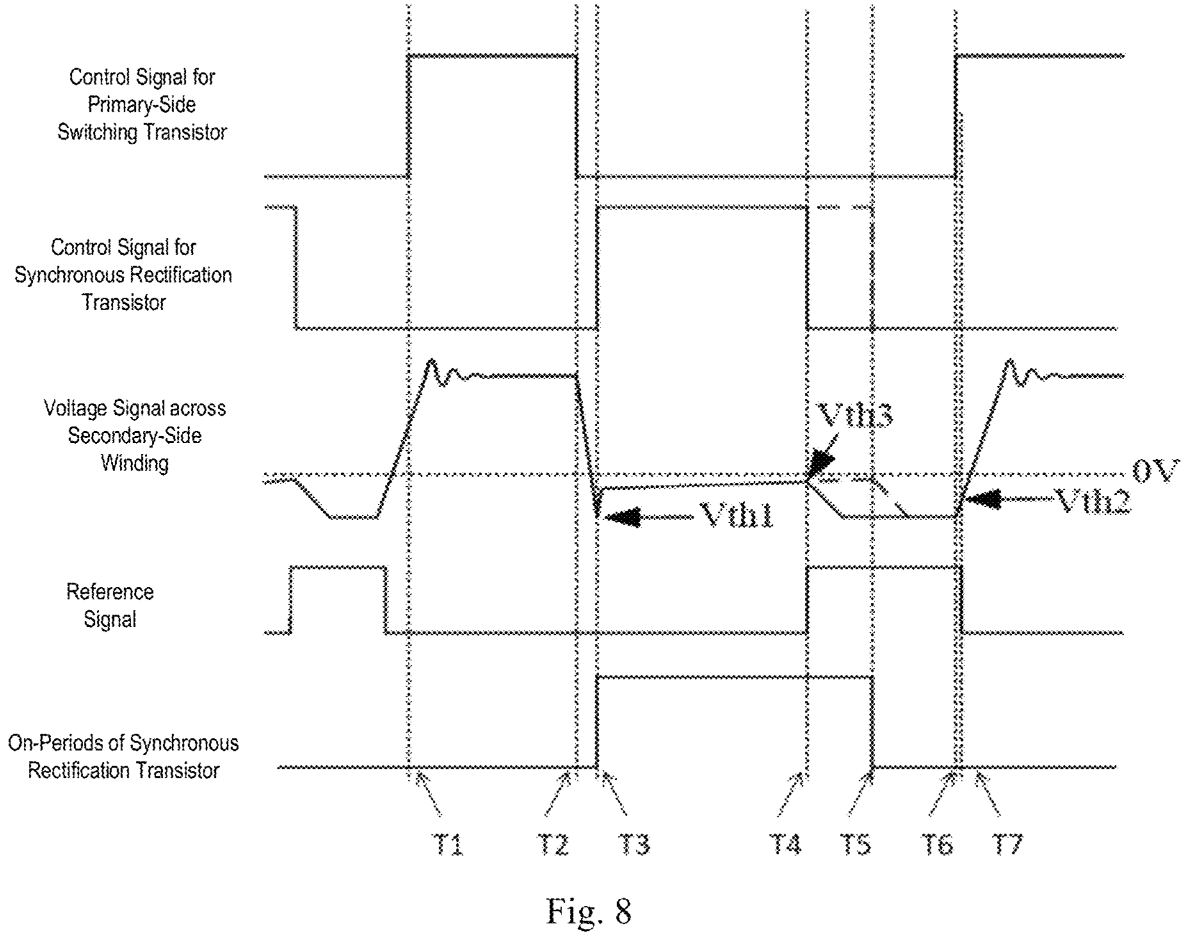
FIG. 8 is a diagram showing waveforms of multiple signals in an isolated power supply according to an embodiment of the present disclosure.

For example, referring to FIG. 8, in addition to the first conduction time for determining the turn-off instant for the synchronous rectification transistor, a second predetermined voltage may be given to determine the turn-off instant for the synchronous rectification transistor. For example, the second predetermined voltage may be set to be equal to a voltage denoted as Vth3 in FIG. 8. As shown in FIG. 8, when the control signal generation module detects that the voltage signal across the secondary-side winding reaches Vth3 at instant T4, this instant may be determined as the turn-off instant for the synchronous rectification transistor.

For example, if the voltage signal across the secondary-side winding reaches the second predetermined voltage first, then the instant at which the voltage signal across the secondary-side winding reaches the second predetermined voltage may be determined as the turn-off instant for the synchronous rectification transistor. If the conduction time of the synchronous rectification transistor reaches the first conduction time first, then the instant at which the conduction time of the synchronous rectification transistor reaches the first conduction time may be determined as the turn-off instant for the synchronous rectification transistor.

For example, when determining that the current instant is the turn-on instant for the synchronous rectification transistor, the control signal generation module may invert the control signal for the secondary-side synchronous rectification transistor (e.g., by generating a transition from a low level to a high level in the second topmost waveform in FIG. 7, which provides an indication for turning on the secondary-side synchronous rectification transistor). Moreover, when determining that the current instant is the turn-off instant for the synchronous rectification transistor, it may invert the control signal for the secondary-side synchronous rectification transistor (e.g., by generating a transition from a high level to a low level in the second topmost waveform in FIG. 7, which provides an indication for turning off the secondary-side synchronous rectification transistor).

For example, in the OFF state of the secondary-side synchronous rectification transistor 12, a signal indicating that the synchronous rectification transistor is OFF may be generated and output to the primary-side control signal generation circuit 14. Continuing the example of FIG. 7, in the second period of the voltage signal across the secondary-side winding, the control signal generation module may determine that instant T9 is the turn-on instant for the synchronous rectification transistor. Accordingly, a high-level signal may be output to the control terminal of the secondary-side synchronous rectification transistor 12 to switch the secondary-side synchronous rectification transistor 12 to the ON state. At instant T10, the control signal generation module may determine that the current instant is the turn-off instant for the synchronous rectification transistor, and a low-level signal may be responsively output to the control terminal of the secondary-side synchronous rectification transistor 12 to switch the secondary-side synchronous rectification transistor 12 to the OFF state. An input terminal of the control signal generation module may be electrically connected to the secondary-side winding via a sampling circuit in order to acquire a sampled signal of the voltage signal across the secondary-side winding.

For example, at instant T10, in the OFF state of the secondary-side synchronous rectification transistor 12, the control signal generation module may generate and output a signal indicating that the synchronous rectification transistor being OFF to the primary-side control signal generation circuit 14, thereby notifying the primary-side control signal generation circuit 14 to turn on the primary-side switching transistor 11.

Notably, the first instant at which an indication for turning off the synchronous rectification transistor is provided is not limited to being at a falling edge of the control signal for the synchronous rectification transistor (e.g., T10 in FIG. 7), because the first instant may be any instant determined based on the instant at which the synchronous rectification transistor is turned off. For example, the first instant may be an instant at the end of a first predetermined delay interval after the synchronous rectification transistor is turned off (e.g., instant T5, which is delayed by a certain length of time with respect to instant T4 when the synchronous rectification transistor is turned off). Alternatively, the first instant may be determined based on an instant at which the voltage signal across the secondary-side winding reaches a third predetermined voltage after the synchronous rectification transistor is turned off.

Likewise, the second instant at which an indication for turning on the primary-side switching transistor is provided is not limited to being at a rising edge of the control signal for the primary-side switching transistor (e.g., T11 in FIG. 7), because the second instant may be any instant determined based on the instant at which the primary-side switching transistor is turned on. For example, the second instant may be an instant at the end of a second predetermined delay interval after the primary-side switching transistor is turned on. Alternatively, the second instant may be determined based on an instant at which the voltage signal across the secondary-side winding reaches a fourth predetermined voltage after the primary-side switching transistor is turned on (e.g., T12 in FIG. 7). According to the present invention, the first and second instants are not limited to being determined according to any of the foregoing method. Those skilled in the art may know other suitable conventional methods capable of determining the first instant at which an indication for turning off the synchronous rectification transistor is provided and the second instant at which an indication for turning on the primary-side switching transistor is provided, and it is intended that these be considered as within the contemplation of the present invention.

Figures 2, 3:
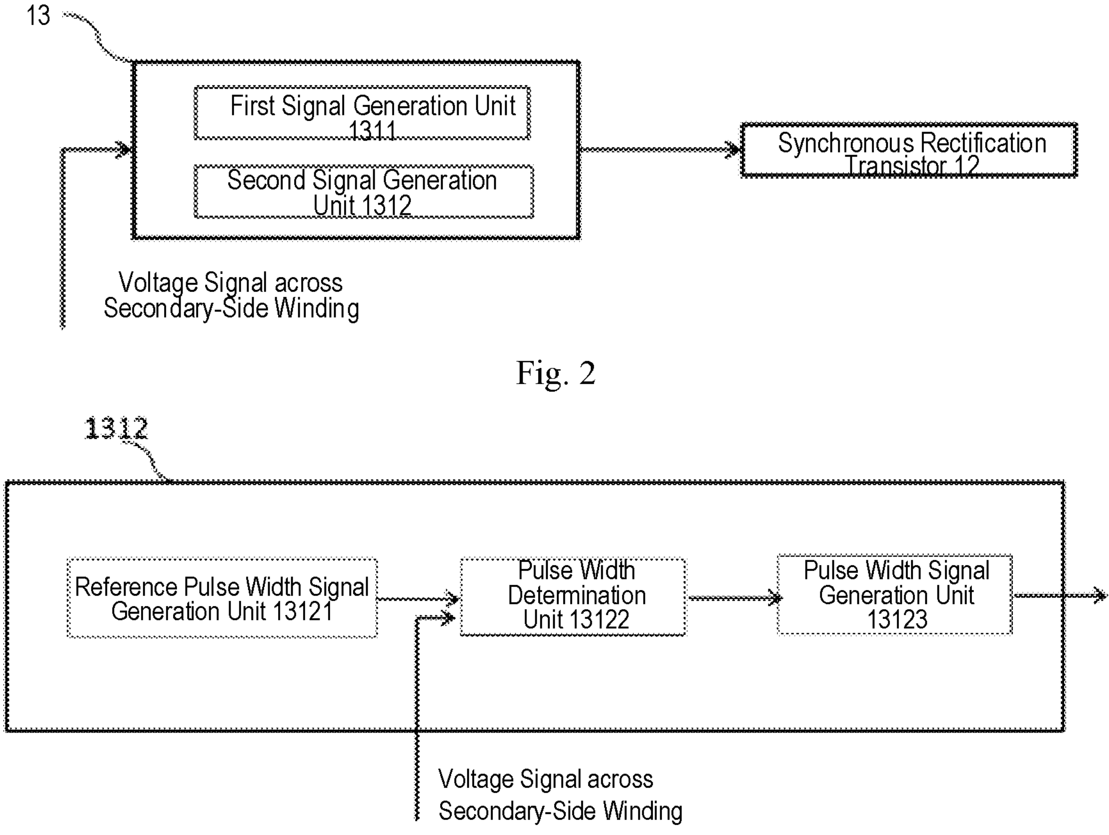
FIG. 2 is a schematic circuit diagram of a control signal generation module according to an embodiment of the present disclosure.
FIG. 3 is a schematic circuit diagram of a second signal generation unit according to an embodiment of the present disclosure.

In one possible embodiment, referring to FIG. 2, the secondary-side control signal generation circuit includes a first signal generation unit 1311 and a second signal generation unit 1312.

For example, an input terminal of the first signal generation unit 1311 is electrically connected to the secondary-side winding, and an output terminal of the first signal generation unit 1311 is electrically connected to the synchronous rectification transistor 12. An input terminal of the second signal generation unit 1312 is electrically connected to the secondary-side winding, and an output terminal of the second signal generation unit 1312 is electrically connected to the synchronous rectification transistor 12.

For example, the first signal generation unit 1311 is configured to determine, after the primary-side switching transistor is turned off, the turn-on instant for the synchronous rectification transistor based on an instant when the voltage signal across the secondary-side winding reaches the first predetermined voltage. Moreover, it is configured to generate and output a rising edge of the control signal based on the turn-on instant of the synchronous rectification transistor. Continuing the example of FIG. 7, the first predetermined voltage is equal to voltage U9, and at instant T9, the primary-side switching transistor is in the OFF state, and the voltage signal across the secondary-side winding reaches the first predetermined voltage. Accordingly, instant T9 is determined as the turn-on instant for the synchronous rectification transistor, and a rising edge of the control signal is generated and output at this instant. That is, a high-level signal starts being output to the synchronous rectification transistor from instant T9.

For example, the second signal generation unit 1312 is configured to determine the pulse width of the reference signal in the previous switching period and adjust the first conduction time for the synchronous rectification transistor in the present switching period based on a relationship of the pulse width of the reference signal in the previous switching period and the predetermined reference period. It is also configured to determine an instant as the turn-off instant for the synchronous rectification transistor: when a period of time over which the synchronous rectification transistor has been conducted reaches the first conduction time; or instant when the voltage signal across the secondary-side winding reaches the second predetermined voltage. It is further configured to generate and output a falling edge of the control signal for the synchronous rectification transistor based on the turn-off instant. For example, the turn-off instant for the synchronous rectification transistor may be instant T4 in FIG. 7, or instant T4 in FIG. 8. In the former case, the second signal generation unit 1312 may generate and output a falling edge of the control signal at instant T4. That is, the synchronous rectification transistor may be controlled to be turned off at instant T4.

In one possible embodiment, referring to FIG. 3, the second signal generation unit 1312 includes a reference pulse width signal generation unit 13121, a pulse width determination unit 13122 and a pulse width signal generation unit 13123.

For example, a first input terminal of the pulse width determination unit 13122 is electrically connected to the secondary-side winding, and a second input terminal of the pulse width determination unit 13122 is electrically connected to an output terminal of the reference pulse width signal generation unit 13121. An input terminal of the pulse width signal generation unit 13123 is electrically connected to an output terminal of the pulse width determination unit 13122, and an output terminal of the pulse width signal generation unit 13123 is electrically connected to the synchronous rectification transistor.

For example, the reference pulse width signal generation unit is configured to generate and output a reference pulse width signal, which is active for an amount of time equal to the predetermined reference period.

For example, the pulse width determination unit is configured to compare the pulse width of the reference signal in the previous switching period with a period of time over which the reference pulse width signal has been active, and to output a determination result. For example, if the pulse width of the reference signal in the previous switching period is 0.4 microseconds and the reference pulse width signal has been active for 0.6 microseconds, the pulse width determination unit may output a low-level signal since the pulse width of the reference signal in the previous switching period is shorter than the period over which the reference pulse width signal has been active. On the contrary, if the pulse width of the reference signal in the previous switching period is longer than the period over which the reference pulse width signal has been active, the pulse width determination unit may output a high-level signal.

For example, the pulse width signal generation unit is configured to modify the first conduction time for the synchronous rectification transistor in the previous switching period based on the result output from the pulse width determination unit and take the modified value as the first conduction time for the synchronous rectification transistor in the present switching period. It is also configured to determine an instant when a period of time over which the synchronous rectification transistor has been conducted reaches the first conduction time as the turn-off instant for the synchronous rectification transistor. It is further configured to generate and output a falling edge of the control signal for the synchronous rectification transistor based on its turn-off instant. For example, the pulse width signal generation unit may include a voltage-controlled pulse width generation circuit, which enables the pulse width signal generation unit to output a pulse width signal with a wider pulse width in response to a higher incoming voltage (from the output terminal of the pulse width determination unit). Since the turn-off instant for the synchronous rectification transistor may be determined as an instant at which the falling edge of the pulse width signal occurs, the wider the pulse width of the pulse width signal is, the longer the period between the turn-off and the turn-on instants for the synchronous rectification transistor determined by the pulse width signal generation unit, i.e., the conduction time of the synchronous rectification transistor 12, will be.

Figure 4:
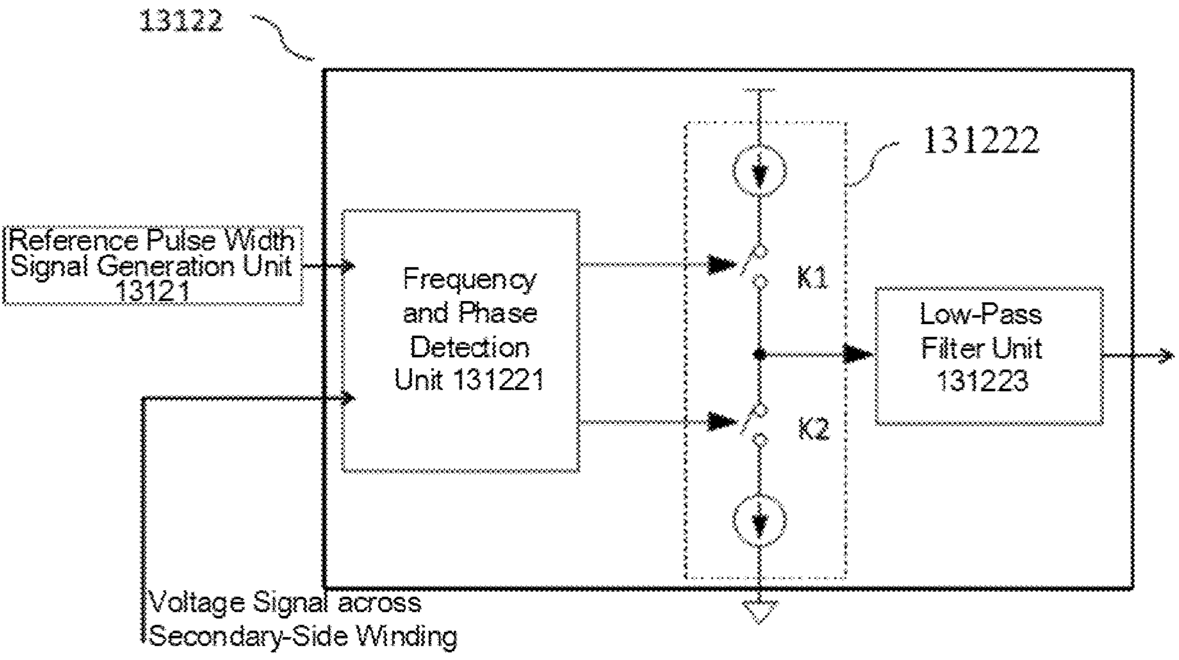
FIG. 4 is a schematic circuit diagram of a pulse width determination unit according to an embodiment of the present disclosure.

In one possible embodiment, referring to FIG. 4, the pulse width determination unit 13122 may include a phase-locked loop circuit including a frequency and phase detection unit 131221, a current generation unit 131222 and a low-pass filter unit 131223.

For example, a first input terminal of the frequency and phase detection unit is electrically connected to the secondary-side winding, and a second input terminal of the frequency and phase detection unit is electrically connected to the output terminal of the reference pulse width signal generation unit. An input terminal of the current generation unit is electrically connected to an output terminal of the frequency and phase detection unit. An input terminal of the low-pass filter unit is electrically connected to an output terminal of the current generation unit, and an output terminal of the low-pass filter unit is electrically connected to the input terminal of the pulse width signal generation unit.

For example, the frequency and phase detection unit is configured to determine the relationship of the pulse width of the reference signal in the previous switching period and a pulse width of the reference pulse width signal, and to output a result of frequency and phase detection. The frequency and phase detection unit 131221 may adopt a known technique to compare the pulse width of the reference signal in the previous switching period with the pulse width of the reference pulse width signal, which is, however, not detailed herein for the sake of brevity. A sampling circuit may be connected between the frequency and phase detection unit and the secondary-side winding. The sampling circuit may sample the voltage signal across the secondary-side winding and generate a sampled signal to the frequency and phase detection unit. Notably, according to the present invention, the frequency and phase detection unit is used principally to compare the pulse widths of the two signals and is not limited to being implemented as a frequency and phase detector or the like commonly used in the art.

For example, the current generation unit is configured to generate and output a pull-up current signal (e.g., an output current of a first charge pump coupled to the frequency and phase detection unit via K1 in FIG. 4) when the pulse width of the reference pulse width signal is shorter than the pulse width of the reference signal. It is also configured to generate and output a pull-down current signal (e.g., an output current of a second charge pump coupled to the frequency and phase detection unit via K2 in FIG. 4) when the pulse width of the reference pulse width signal is longer than the pulse width of the reference signal. For example, the current generation unit may include a first charge pump and a second charge pump. An output terminal of the first charge pump is electrically connected to the input terminal of the low-pass filter unit via a first switch K1, and an input terminal of the second charge pump is electrically connected to the input terminal of the low-pass filter unit via a second switch K2. The first switch K1 and the second switch K2 may be turned on or off according to the result of frequency and phase detection output from the frequency and phase detection unit. Specifically, when the result of frequency and phase detection indicates that the pulse width of the reference signal is longer than the pulse width of the reference pulse width signal, the first switch K1 may be turned on to allow a capacitor in the low-pass filter unit 131223 to be charged. When the result of frequency and phase detection indicates that the pulse width of the reference signal is shorter than the pulse width of the reference pulse width signal, the second switch K2 may be turned on to allow the capacitor in the low-pass filter unit 131223 to be discharged.

For example, the low-pass filter unit is configured to low pass filter the output of the current generation unit, to take the filtered electrical signal as the aforementioned determination result, and to output the determination result to the pulse width signal generation unit. For example, the low-pass filter unit includes at least one capacitor. In case of the pull-up current signal being received, the capacitor may be charged. If the pull-down current signal is received, the capacitor may be discharged. An output electrical signal (either a current signal or a voltage signal) from the low-pass filter unit is provided to the pulse width signal generation unit as the determination result. How the above discussed components operate would be known in the art, and further description thereof is therefore omitted herein.

In the control circuit provided herein, through pulse width comparisons and modifications, an average of the pulse width of the reference signal over a certain length of time can be maintained approximately equal to the predetermined reference period. In this way, the secondary-side synchronous rectification transistor can be controlled to be turned on and off in a self-adaptive manner, and its conduction time remains compatible with the operation of the circuit, allowing the isolated power supply to provide improved conversion efficiency. Additionally, since the pulse width of the reference signal (reflecting the time interval between the turn-off instant of the synchronous rectification transistor and the turn-on instant of the primary-side switching transistor in a given switching period) can be maintained substantially equal to the predetermined reference period, an anti-breakdown mechanism is established, which ensures that the primary-side switching transistor is turned on in an OFF state of the synchronous rectification transistor.

Figure 5:
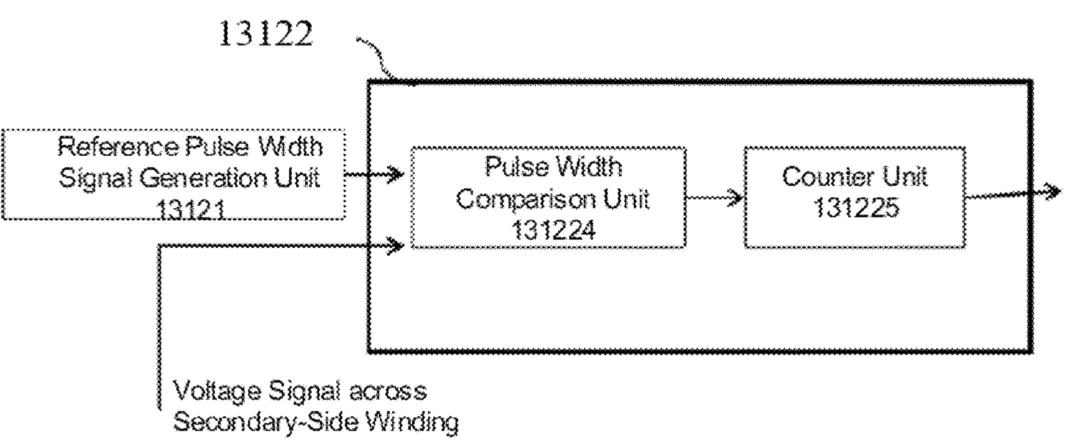
FIG. 5 is a schematic circuit diagram of another pulse width determination unit according to an embodiment of the present disclosure.
Figure 6:
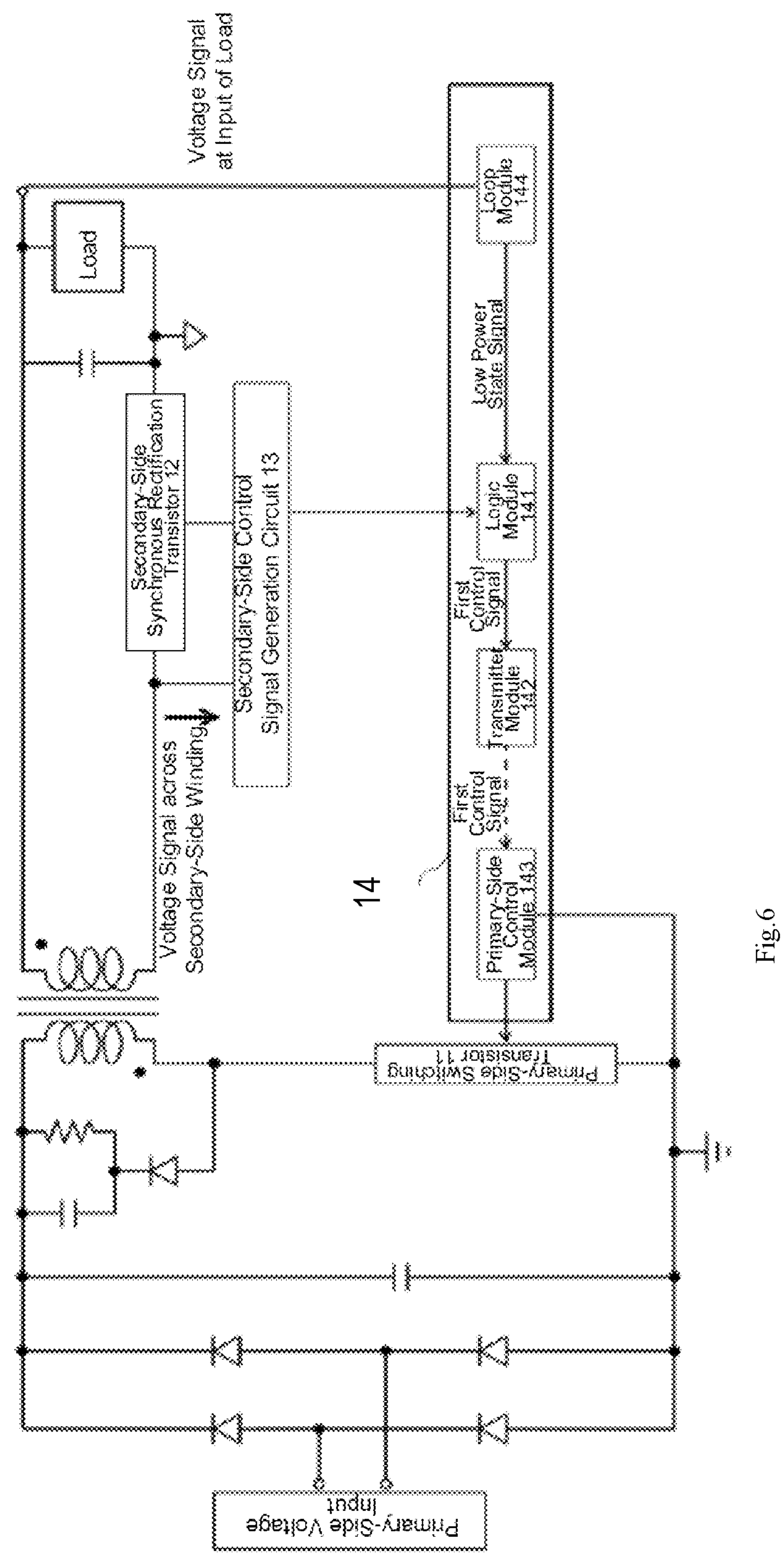
FIG. 6 is a schematic circuit diagram of another isolated power supply according to an embodiment of the present disclosure.

In one possible embodiment, referring to FIG. 5, the pulse width determination unit 13122 includes a pulse width comparison unit 131224 and a counter unit 131225.

For example, a first input terminal of the pulse width comparison unit is electrically connected to the secondary-side winding, and a second input terminal of the pulse width comparison unit is electrically connected to the reference pulse width signal generation unit. An input terminal of the counter unit is electrically connected to the pulse width comparison unit, and an output terminal of the counter unit is electrically connected to the input terminal of the pulse width signal generation unit.

For example, the pulse width comparison unit 131224 is configured to determine a relationship of the pulse width of the reference signal in the previous switching period and the pulse width of the reference pulse width signal, and to generate and output a comparison result. The pulse width comparison unit may utilize a known technique to compare the pulse width of the reference signal with the pulse width of the reference pulse width signal, and to generate and output the comparison result (e.g., by discharging a capacitor at a constant rate respectively under the action of the reference signal and the reference pulse width signal and then comparing their final voltages), which is, however, not detailed herein for the sake of brevity.

For example, the counter unit configured to: determine a count value from the comparison result; obtain a counting result based on the count value and the predetermined reference value; take the counting result as the determination result; and output the determination result to the pulse width signal generation unit. If the comparison result indicates that the pulse width of the reference signal is longer than the pulse width of the reference pulse width signal, the count value is positive (i.e., in this case, the counter unit increases a value of an output voltage signal in an adaptive manner). If the comparison result indicates that the pulse width of the reference signal is shorter than a length of time over which the reference pulse width signal is kept active, the count value is negative (i.e., in this case, the counter unit reduces the value of the output voltage signal in an adaptive manner). For example, assuming the pulse width of the reference signal is 0.8 microseconds, the pulse width of the reference pulse width signal is 0.6 microseconds, and the predetermined reference value is 20, the counter unit may add an increment of 2 to the predetermined reference value and output the counting result as 22. Alternatively, it may add an increment of 1 to the predetermined reference value and output the counting result as 21. Assuming the pulse width of the reference signal is 0.4 microseconds, the pulse width of the reference pulse width signal is 0.6 microseconds, and the predetermined reference value is 20, the counter unit may add an increment of −2 to the predetermined reference value and output the counting result as 18. Alternatively, it may add an increment of −1 to the predetermined reference value and output the counting result as 19. In other words, the counter unit 131225 may add, to the predetermined reference value, a value in proportion to the difference of the pulse widths of the reference signal and the reference pulse width signal (which is positive when the pulse width of the reference signal is longer than the pulse width of the reference pulse width signal, or is negative when the pulse width of the reference signal is shorter than the pulse width of the reference pulse width signal). Alternatively, it may add 1 (the minimum possible value by which the counter can increment a count value each time) to the predetermined reference value when the pulse width of the reference signal is longer than the pulse width of the reference pulse width signal, or add −1 (the minimum possible value by which the counter can decrement a count value each time) to the predetermined reference value when the pulse width of the reference signal is shorter than the pulse width of the reference pulse width signal. This application is not limited to any particular value by which the predetermined reference value is changed each time, as long as it can be ensured that the predetermined reference value is increased when the pulse width of the reference signal is longer than the pulse width of the reference pulse width signal, and that the predetermined reference value is decreased when the pulse width of the reference signal is shorter than the pulse width of the reference pulse width signal. The aforementioned length of time over which the reference pulse width signal is kept active may correspond to the predetermined reference period.

In one possible embodiment, the pulse width signal generation unit may be further configured to generate and output an OFF control signal based on the result of counting (i.e., the result of determination) from the counter unit. The counting result may be positively correlated with a pulse width of the control signal. For example, the pulse width signal generation unit may include a digital-to-analog converter (DAC) and a voltage-controlled pulse width generation circuit connected in series with the DAC. With this design, in response to a greater counting result, it can output a pulse width signal with a wider pulse width. Alternatively, a timer/counter may be used, which can receive the counting result from the counter unit and a global clock signal, and start a timer, or start counting the number of pulses of the global clock signal, at the turn-on instant for the synchronous rectification transistor 12 (e.g., T9). Other implementations are also possible. For example, when the counting result is 21, the pulse width of the OFF control signal output from the pulse width signal generation unit may be 0.21 microseconds; when the counting result is 18, the pulse width of the OFF control signal output from the pulse width signal generation unit may be 0.18 microseconds. These numbers are present for exemplification and illustration only and not intended to limit the scope of the present invention in any sense.

In one possible embodiment, the pulse width signal generation unit includes a first signal generation element.

For example, a first input terminal of the first signal generation element is electrically connected to the output terminal of the counter unit, and an output terminal of the first signal generation element is electrically connected to a control terminal of the control signal generation module.

For example, the first signal generation element is configured to start a timer at the turn-on instant for the secondary-side synchronous rectification transistor, and determine an instant at which the value of the timer is equal to the counting result as the turn-off instant for the synchronous rectification transistor. It is also configured to generate and output a falling edge of the control signal based on turn-off instant of the synchronous rectification transistor. For example, the first signal generation element may be a timer or counter, which can receive the counting result from the counter unit and a global clock signal, and start a timer, or start counting the number of pulses of the global clock signal, at the turn-on instant for the secondary-side synchronous rectification transistor 12 (e.g., T9). At this time, the aforementioned predetermined value may be 0. When the value of the timer, or the number of pulses of the global clock signal, becomes equal to the counting result, the instant at which the value of the timer, or the number of pulses of the global clock signal, becomes equal to the counting result may be taken as an instant for deactivating the OFF control signal (e.g., T10), and the control signal for the synchronous rectification transistor may be then generated and output thereto.

In one possible embodiment, referring to FIGS. 1 to 7, the primary-side switch control circuit 14 includes a logic module 141, a transmitter module 142 and a primary-side control module 143.

For example, an input terminal of the logic module 141 is electrically connected to the output terminal of the secondary-side control signal generation circuit 13. An input terminal of the transmitter module 142 is electrically connected to an output terminal of the logic module 141. The primary-side control module 143 is coupled to the transmitter module 142, and its output terminal is electrically connected to the control terminal of the primary-side switching transistor 11.

For example, the logic module 141 is configured to generate and output a first control signal in the OFF state of the secondary-side synchronous rectification transistor 12. Upon receiving the first control signal, the transmitter module 142 may transmit it to the primary-side control module 143. Under the control of this signal, the primary-side switching transistor may be turned on. For example, the logic module 141 may determine whether the secondary-side synchronous rectification transistor 12 is OFF, by receiving an OFF state signal (e.g., indicating that the secondary-side synchronous rectification transistor has been turned off) from the secondary-side control signal generation circuit 13, or by detecting the ON/OFF state of the secondary-side synchronous rectification transistor 12. At this point, the logic module 141 may generate the first control signal, and the transmitter module 142 may then send it to the primary-side control module 143. When receiving the first control signal, the primary-side control module 143 may generate and output a turn-on signal to the primary-side switching transistor 11, which then turns the primary-side switching transistor 11 on. The transmitter module 142 may be an optocoupler, which may operate in the same manner as those used in conventional known flyback isolated power supplies.

According to another aspect of the present disclosure, referring to FIG. 1, an isolated power supply comprising the control circuit as discussed above is provided.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the invention. The terminology used herein is chosen to best explain the principles of the embodiment, the practical application or technical improvement over technologies found in the marketplace, or to enable others of ordinary skill in the art to understand the embodiments disclosed herein.

What is claimed is:

1. A control circuit for an isolated power supply, wherein the isolated power supply comprises: a transformer comprising a primary-side winding and a secondary-side winding; a primary-side switching transistor coupled to the primary-side winding; and a synchronous rectification transistor coupled to the secondary-side winding, and wherein the control circuit comprises:

a secondary-side control signal generation circuit, comprising: an input terminal that is electrically connected to the secondary-side winding and is for detecting a voltage signal across the secondary-side winding; and an output terminal that is electrically connected to a control terminal of the synchronous rectification transistor and is for outputting a control signal for the synchronous rectification transistor; and a primary-side control signal generation circuit, comprising: an input terminal for receiving a signal indicating that the synchronous rectification transistor is turned off; and an output terminal that is electrically connected to a control terminal of the primary-side switching transistor and is for outputting a control signal for the primary-side switching transistor, wherein in a present switching period, the secondary-side control signal generation circuit provides an indication for turning on the synchronous rectification transistor when detecting that the voltage signal across the secondary-side winding reaches a first predetermined voltage; and provides an indication for turning off the synchronous rectification transistor when a period of time over which the synchronous rectification transistor has been conducted reaches a first conduction time, wherein the first conduction time is adjustable based on a first instant at which an indication for turning off the synchronous rectification transistor is provided in a previous switching period, a second instant at which an indication for turning on the primary-side switching transistor is provided in the previous switching period and a predetermined reference period, wherein the secondary-side control signal generation circuit comprises:

a first signal generation unit, comprising an input terminal electrically connected to the secondary-side winding and an output terminal electrically connected to the synchronous rectification transistor, wherein the first signal generation unit is configured to determine an instant at which the voltage signal across the secondary-side winding reaches the first predetermined voltage as a turn-on instant for the synchronous rectification transistor, and to generate and output a rising edge of the control signal for the synchronous rectification transistor based on the turn-on instant for the synchronous rectification transistor; and a second signal generation unit, comprising an input terminal electrically connected to the secondary-side winding and an output terminal electrically connected to the synchronous rectification transistor, wherein the second signal generation unit is configured to: i) determine a pulse width of a reference signal in the previous switching period; ii) adjust the first conduction time for the synchronous rectification transistor in the present switching period based on a relationship of the pulse width of the reference signal in the previous switching period and the predetermined reference period; iii) determine a turn-off instant for the synchronous rectification transistor based on an instant when the period of time over which the synchronous rectification transistor has been conducted reaches the first conduction time; iv) and generate and output a falling edge of the control signal for the synchronous rectification transistor based on the turn-off instant for the synchronous rectification transistor, wherein the reference signal is generated based on the first instant and the second instant, and wherein the pulse width of the reference signal is a time difference between the first and second instants in a same period.

2. The control circuit according to claim 1, wherein the second signal generation unit is further configured to: compare the voltage signal across the secondary-side winding with a second predetermined voltage; and determine the turn-off instant for the synchronous rectification transistor based on: an instant at which the voltage signal across the secondary-side winding reaches the second predetermined voltage; or the instant when the period of time over which the synchronous rectification transistor has been conducted reaches the first conduction time, whichever is earlier.

3. The control circuit according to claim 1, wherein within the same period, the first instant is earlier than the second instant.

4. The control circuit according to claim 1, wherein the second signal generation unit comprises:

a reference pulse width signal generation unit, configured to generate and output a reference pulse width signal indicating the predetermined reference period;

a pulse width determination unit, comprising a first input terminal electrically connected to the secondary-side winding and a second input terminal electrically connected to an output terminal of the reference pulse width signal generation unit, wherein the pulse width determination unit is configured to compare the pulse width of the reference signal in the previous switching period with a period of time over which the reference pulse width signal is active; and a pulse width signal generation unit, comprising an input terminal electrically connected to an output terminal of the pulse width determination unit and an output terminal electrically connected to the synchronous rectification transistor, wherein the pulse width signal generation unit is configured to: i) determine the first conduction time for the synchronous rectification transistor in the present switching period based on a comparison result output from the pulse width determination unit; ii) determine a first conduction time for the synchronous rectification transistor in the previous switching period; iii) determine the instant when the period of time over which the synchronous rectification transistor has been conducted reaches the first conduction time as the turn-off instant for the synchronous rectification transistor; and iv) generate and output the falling edge of the control signal based on the turn-off instant for the synchronous rectification transistor.

5. The control circuit according to claim 4, wherein the pulse width determination unit comprises:

a frequency and phase detection unit, comprising a first input terminal electrically connected to the secondary-side winding and a second input terminal electrically connected to the output terminal of the reference pulse width signal generation unit, wherein the frequency and phase detection unit is configured to determine a relationship of the pulse width of the reference signal in the previous switching period and a pulse width of the reference pulse width signal, and to generate and output a result of frequency and phase detection;

a current generation unit, comprising an input terminal electrically connected to an output terminal of the frequency and phase detection unit, wherein the current generation unit is configured to: generate and output a pull-up current signal when the pulse width of the reference pulse width signal is shorter than the pulse width of the reference signal; or generate and output a pull-down current signal when the pulse width of the reference pulse width signal is longer than the pulse width of the reference signal; and a low-pass filter unit, comprising an input terminal electrically connected to an output terminal of the current generation unit and an output terminal electrically connected to the input terminal of the pulse width signal generation unit, wherein the low-pass filter unit is configured to low-pass filter an electrical signal output from the current generation unit and to output the filtered electrical signal to the pulse width signal generation unit.

6. The control circuit according to claim 4, wherein the pulse width determination unit comprises:

a pulse width comparison unit, comprising a first input terminal electrically connected to the secondary-side winding and a second input terminal electrically connected to the reference pulse width signal generation unit, wherein the pulse width comparison unit is configured to determine a relationship of the pulse width of the reference signal in the previous switching period and a pulse width of the reference pulse width signal, and to generate and output the comparison result; and a counter unit, comprising an input terminal electrically connected to the pulse width comparison unit and an output terminal electrically connected to the input terminal of the pulse width signal generation unit, wherein the counter unit is configured to: determine a count value based on the comparison result; determine a counting result in the present period based on the count value and a counting result in the previous period; and output the counting result to the pulse width signal generation unit.

7. The control circuit according to claim 6, wherein when the comparison result indicates that the pulse width of the reference signal is longer than the pulse width of the reference pulse width signal, the counter unit provides the pulse width signal generation unit with an indication for prolonging the first conduction time; or when the comparison result indicates that the pulse width of the reference signal is shorter than the period of time over which the reference pulse width signal is active, the counter unit provides the pulse width signal generation unit with an indication for shortening the first conduction time.

8. The control circuit according to claim 6, wherein the pulse width signal generation unit comprises:

a first signal generation element, comprising a first input terminal electrically connected to an output terminal of a counter unit and an output terminal electrically connected to the control terminal of the synchronous rectification transistor, wherein the first signal generation element, is configured to: start a timer at the turn-on instant for the secondary-side synchronous rectification transistor; determine an instant at which a value of the timer is equal to the counting result as the turn-off instant for the synchronous rectification transistor; and generate and output the falling edge of the control signal based on the turn-off instant for the synchronous rectification transistor.

9. The control circuit according to claim 1, wherein the primary-side control signal generation circuit comprises:

a logic module, comprising an input terminal electrically connected to the output terminal of the secondary-side control signal generation circuit, wherein the logic module is configured to generate and output a first control signal when the secondary-side synchronous rectification transistor is turned off;

a transmitter module, comprising an input terminal electrically connected to an output terminal of the logic module, wherein the transmitter module is configured to, upon receiving the first control signal, transmit the first control signal; and a primary-side control module coupled to the transmitter module, wherein the primary-side control module comprises an output terminal electrically connected to the primary-side switching transistor, wherein the primary-side control module is configured to, in response to receiving the first control signal, control the primary-side switching transistor to be turned on.

10. The control circuit according to claim 1, wherein the first instant is generated: when the synchronous rectification transistor is turned off; or at an end of a first predetermined delay interval after the synchronous rectification transistor is turned off; or when the voltage signal across the secondary-side winding reaches a third predetermined voltage after the synchronous rectification transistor is turned off.

11. The control circuit according to claim 1, wherein the second instant is generated: when the primary-side switching transistor is turned on; or at an end of a second predetermined delay interval after the primary-side switching transistor is turned on; or when the voltage signal across the secondary-side winding reaches a fourth predetermined voltage after the primary-side switching transistor is turned on.

12. An isolated power supply comprising a control circuit, wherein the isolated power supply comprises: a transformer comprising a primary-side winding and a secondary-side winding; a primary-side switching transistor coupled to the primary-side winding; and a synchronous rectification transistor coupled to the secondary-side winding, and wherein the control circuit comprises:

a secondary-side control signal generation circuit, comprising: an input terminal that is electrically connected to the secondary-side winding and is for detecting a voltage signal across the secondary-side winding; and an output terminal that is electrically connected to a control terminal of the synchronous rectification transistor and is for outputting a control signal for the synchronous rectification transistor; and a primary-side control signal generation circuit, comprising: an input terminal for receiving a signal indicating that the synchronous rectification transistor is turned off; and an output terminal that is electrically connected to a control terminal of the primary-side switching transistor and is for outputting a control signal for the primary-side switching transistor, wherein in a present switching period, the secondary-side control signal generation circuit provides an indication for turning on the synchronous rectification transistor when detecting that the voltage signal across the secondary-side winding reaches a first predetermined voltage; and provides an indication for turning off the synchronous rectification transistor when a period of time over which the synchronous rectification transistor has been conducted reaches a first conduction time, wherein the first conduction time is adjustable based on a first instant at which an indication for turning off the synchronous rectification transistor is provided in a previous switching period, a second instant at which an indication for turning on the primary-side switching transistor is provided in the previous switching period and a predetermined reference period, wherein the secondary-side control signal generation circuit comprises:

a first signal generation unit, comprising an input terminal electrically connected to the secondary-side winding and an output terminal electrically connected to the synchronous rectification transistor, wherein the first signal generation unit is configured to determine an instant at which the voltage signal across the secondary-side winding reaches the first predetermined voltage as a turn-on instant for the synchronous rectification transistor, and to generate and output a rising edge of the control signal for the synchronous rectification transistor based on the turn-on instant for the synchronous rectification transistor; and a second signal generation unit, comprising an input terminal electrically connected to the secondary-side winding and an output terminal electrically connected to the synchronous rectification transistor, wherein the second signal generation unit is configured to: i) determine a pulse width of a reference signal in the previous switching period; ii) adjust the first conduction time for the synchronous rectification transistor in the present switching period based on a relationship of the pulse width of the reference signal in the previous switching period and the predetermined reference period; iii) determine a turn-off instant for the synchronous rectification transistor based on an instant when the period of time over which the synchronous rectification transistor has been conducted reaches the first conduction time; iv) and generate and output a falling edge of the control signal for the synchronous rectification transistor based on the turn-off instant for the synchronous rectification transistor, wherein the reference signal is generated based on the first instant and the second instant, and wherein the pulse width of the reference signal is a time difference between the first and second instants in a same period.

13. The isolated power supply according to claim 12, wherein the second signal generation unit is further configured to: compare the voltage signal across the secondary-side winding with a second predetermined voltage; and determine the turn-off instant for the synchronous rectification transistor based on: an instant at which the voltage signal across the secondary-side winding reaches the second predetermined voltage; or the instant when the period of time over which the synchronous rectification transistor has been conducted reaches the first conduction time, whichever is earlier.

14. The isolated power supply according to claim 12, wherein within the same period, the first instant is earlier than the second instant.

15. The isolated power supply according to claim 12, wherein the second signal generation unit comprises:

a reference pulse width signal generation unit, configured to generate and output a reference pulse width signal indicating the predetermined reference period;

a pulse width determination unit, comprising a first input terminal electrically connected to the secondary-side winding and a second input terminal electrically connected to an output terminal of the reference pulse width signal generation unit, wherein the pulse width determination unit is configured to compare the pulse width of the reference signal in the previous switching period with a period of time over which the reference pulse width signal is active; and a pulse width signal generation unit, comprising an input terminal electrically connected to an output terminal of the pulse width determination unit and an output terminal electrically connected to the synchronous rectification transistor, wherein the pulse width signal generation unit is configured to: i) determine the first conduction time for the synchronous rectification transistor in the present switching period based on a comparison result output from the pulse width determination unit; ii) determine a first conduction time for the synchronous rectification transistor in the previous switching period; iii) determine the instant when the period of time over which the synchronous rectification transistor has been conducted reaches the first conduction time as the turn-off instant for the synchronous rectification transistor; and iv) generate and output the falling edge of the control signal based on the turn-off instant for the synchronous rectification transistor.

16. The isolated power supply according to claim 15, wherein the pulse width determination unit comprises:

a frequency and phase detection unit, comprising a first input terminal electrically connected to the secondary-side winding and a second input terminal electrically connected to the output terminal of the reference pulse width signal generation unit, wherein the frequency and phase detection unit is configured to determine a relationship of the pulse width of the reference signal in the previous switching period and a pulse width of the reference pulse width signal, and to generate and output a result of frequency and phase detection;

a current generation unit, comprising an input terminal electrically connected to an output terminal of the frequency and phase detection unit, wherein the current generation unit is configured to: generate and output a pull-up current signal when the pulse width of the reference pulse width signal is shorter than the pulse width of the reference signal; or generate and output a pull-down current signal when the pulse width of the reference pulse width signal is longer than the pulse width of the reference signal; and a low-pass filter unit, comprising an input terminal electrically connected to an output terminal of the current generation unit and an output terminal electrically connected to the input terminal of the pulse width signal generation unit, wherein the low-pass filter unit is configured to low-pass filter an electrical signal output from the current generation unit and to output the filtered electrical signal to the pulse width signal generation unit.

17. The isolated power supply according to claim 15, wherein the pulse width determination unit comprises:

a pulse width comparison unit, comprising a first input terminal electrically connected to the secondary-side winding and a second input terminal electrically connected to the reference pulse width signal generation unit, wherein the pulse width comparison unit is configured to determine a relationship of the pulse width of the reference signal in the previous switching period and a pulse width of the reference pulse width signal, and to generate and output the comparison result; and a counter unit, comprising an input terminal electrically connected to the pulse width comparison unit and an output terminal electrically connected to the input terminal of the pulse width signal generation unit, wherein the counter unit is configured to: determine a count value based on the comparison result; determine a counting result in the present period based on the count value and a counting result in the previous period; and output the counting result to the pulse width signal generation unit.

18. The isolated power supply according to claim 17, wherein when the comparison result indicates that the pulse width of the reference signal is longer than the pulse width of the reference pulse width signal, the counter unit provides the pulse width signal generation unit with an indication for prolonging the first conduction time; or when the comparison result indicates that the pulse width of the reference signal is shorter than the period of time over which the reference pulse width signal is active, the counter unit provides the pulse width signal generation unit with an indication for shortening the first conduction time.

* * * * *